(12) United States Patent
Olbert et al.

(10) Patent No.: US 8,993,803 B2
(45) Date of Patent: Mar. 31, 2015

(54) METHOD FOR PRODUCING PHOSGENE

(75) Inventors: Gerhard Olbert, Dossenheim (DE); Kai Thiele, Antwerp (BE); Byoung-Yeon Kim, Baton Rouge, LA (US); Heiner Schelling, Kirchheim (DE)

(73) Assignee: BASF SE, Ludwigshafen (DE)

( * ) Notice: Subject to any disclaimer, the term of this patent is extended or adjusted under 35 U.S.C. 154(b) by 273 days.

(21) Appl. No.: 13/255,665

(22) PCT Filed: Mar. 10, 2010

(86) PCT No.: PCT/EP2010/053011
§ 371 (c)(1),
(2), (4) Date: Sep. 9, 2011

(87) PCT Pub. No.: WO2010/103029
PCT Pub. Date: Sep. 16, 2010

(65) Prior Publication Data
US 2011/0319662 A1  Dec. 29, 2011

(30) Foreign Application Priority Data

| Mar. 11, 2009 | (EP) | 09154882 |
| Apr. 6, 2009 | (EP) | 09157407 |

(51) Int. Cl.
*C07C 51/58* (2006.01)
*C01B 31/28* (2006.01)

(52) U.S. Cl.
CPC .................................. *C01B 31/28* (2013.01)
USPC .............................. 562/848; 562/847

(58) Field of Classification Search
CPC ........................................ C01B 31/28
USPC ................................ 562/847, 848
See application file for complete search history.

(56) References Cited

U.S. PATENT DOCUMENTS

| 4,231,959 | A | * | 11/1980 | Obrecht | 562/847 |
| 6,399,823 | B1 | * | 6/2002 | Via et al. | 562/847 |
| 2005/0118088 | A1 | | 6/2005 | Olbert et al. | |
| 2009/0143619 | A1 | | 6/2009 | Kauth et al. | |
| 2011/0269995 | A1 | | 11/2011 | Olbert et al. | |
| 2011/0288334 | A1 | | 11/2011 | Olbert et al. | |

FOREIGN PATENT DOCUMENTS

| EP | 2 067 742 | 6/2009 |
| FR | 2 109 186 | 5/1972 |
| WO | 79/00107 | * 3/1979 ............ G05D 21/02 |
| WO | 2010 076208 | 7/2010 |
| WO | 2010 076209 | 7/2010 |

OTHER PUBLICATIONS

Csuros et al. Investigation of th Reaction Conditions of Phosgene Production, Peridoica Polytechnica, Chemical Engineering, 14, 1-11 (1970).*
Csuros, Z., et al., "Investigation of the Reaction Conditions of Phosgene Production," Periodica Polytechnica, Chemical Engineering, vol. 14, pp. 1-11, (1970) XP 008122442.
"Ullmann's Encyklopaedie der technischen Chemie," vol. A19, pp. 413-414, (1980) (with English translation).
International Search Report Issued Jul. 9, 2010 in PCT/EP10/053011 Filed Mar. 10, 2010.
U.S. Appl. No. 13/140,194, filed Jun. 16, 2011, Olbert, et al.
U.S. Appl. No. 13/140,227, filed Jul. 29, 2011, Olbert, et al.
U.S. Appl. No. 13/266,049, filed Oct. 24, 2011, Stroefer, et al.
U.S. Appl. No. 13/383,549, filed Jan. 11, 2012, Schelling, et al.

* cited by examiner

*Primary Examiner* — Paul A Zucker
*Assistant Examiner* — Mark Luderer
(74) *Attorney, Agent, or Firm* — Oblon, McClelland, Maier & Neustadt, L.L.P.

(57) ABSTRACT

A process for preparing phosgene by reaction of a feed stream (1) obtained by combining and mixing a chlorine feed stream (2) and a carbon monoxide feed stream (3), with the carbon monoxide being introduced in a stoichiometric excess over chlorine, in catalyst tubes filled with beds of activated carbon in a reactor R having a bundle of catalyst tubes, to give a product gas mixture (4) which is separated into a liquid, phosgene-comprising product stream (5) and an offgas stream (6) comprising carbon monoxide which is discharged via a pressure-regulating valve, where the reaction of the feed stream (1) in the reactor R and the separation of the product gas mixture (4) are carried out under a pressure in the range from 2.0 to 6.0 bar gauge pressure, wherein the excess of carbon monoxide in the feed stream (1) to the reactor R is regulated by continuously measuring the flow and the concentration of carbon monoxide in the offgas stream (6), calculating the actual value of the excess of carbon monoxide in the feed stream (1) to the reactor R from these measurements in combination with the continuously measured values for the flow of the carbon monoxide feed stream (3) and the flow of and the chlorine concentration in the chlorine feed stream (2) and matching this to the intended value of the excess of carbon monoxide in the feed stream (1) to the reactor R by adapting the flow of the carbon monoxide feed stream (3), is proposed.

19 Claims, 2 Drawing Sheets

METHOD FOR PRODUCING PHOSGENE

Figure 1:
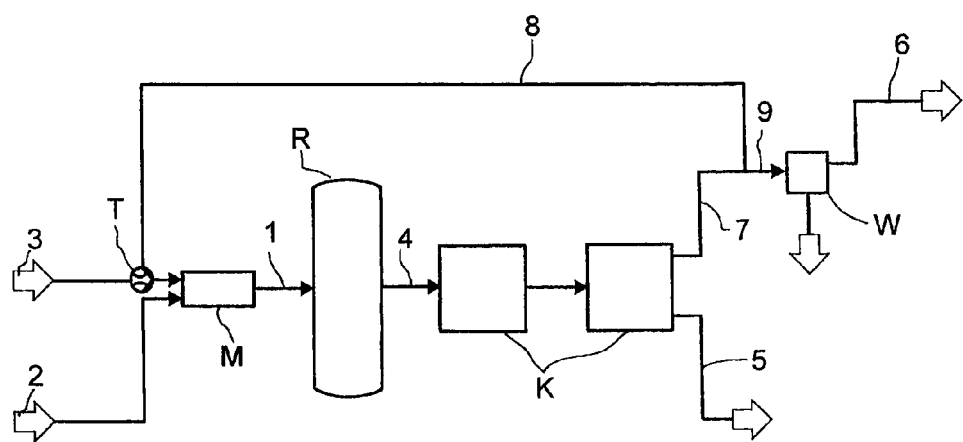

The invention relates to a process for preparing phosgene by gas-phase reaction of carbon monoxide and chlorine in the presence of a solid-state catalyst and also a process for preparing phosgene using the reactor.

Phosgene is an important auxiliary in the preparation of intermediates and end products in virtually all branches of chemistry. The largest field of use in terms of quantity is the preparation of diisocyanates for polyurethane chemistry, in particular tolylene diisocyanate, 4,4-diisocyanatodiphenylmethane and hexamethylene diisocyanate.

Phosgene is prepared industrially in a catalytic gas-phase reaction of carbon monoxide and chlorine in the presence of a solid-state catalyst, preferably activated carbon. The reaction is strongly exothermic; the enthalpy of formation is −107.6 kJ/mol. The reaction is generally carried out in a shell-and-tube reactor by the process described in Ullmanns Enzyklopadie der technischen Chemie, Vol. A 19, pages 413 to 414. Here, the granular catalyst having a particle size in the range from 3 to 5 mm is installed in tubes having an internal diameter in the range from 50 to 70 mm. The reaction starts at 40-50° C., and the temperature in the tubes rises to about 400° C. and then quickly drops. Carbon monoxide is used in a slight excess to ensure that all of the chlorine is reacted and chlorine-free phosgene is obtained. The reaction is generally carried out under superatmospheric pressure, frequently at a gauge pressure of from 2 to 6 bar.

DE 102 08 398 describes a shell-and-tube reactor and a process for preparing phosgene, according to which the corrosion problems in the deflection region of the heat exchanger are reduced and an increased specific cross-sectional loading and thus a higher capacity are therefore made possible.

For this purpose, it is proposed that a reactor for preparing phosgene by gas-phase reaction of carbon monoxide and chlorine in the presence of a solid-state catalyst, having a bundle of parallel catalyst tubes which are arranged in the longitudinal direction of the reactor and whose ends are fixed in tube plates, with a cap at each end of the reactor and deflection plates arranged perpendicular to the longitudinal direction of the reactor in the intermediate space between the catalyst tubes, which deflection plates alternately leave openings free at opposite sides of the interior wall of the reactor, where the catalyst tubes are filled with the solid-state catalyst, the gaseous reaction mixture is passed from one end of the reactor via a cap through the catalyst tubes and is taken off from the opposite end of the reactor via the second cap and a liquid heat transfer medium is passed through the intermediate space around the catalyst tubes, be configured so that the reactor has no tubes in the region of the opening, with an opening being understood to be the region between the free end of a deflection plate and the interior wall of the reaktor.

Phosgene reactors are operated to complete conversion of the chlorine since the specifications required for subsequent use, in particular for preparing isocyanates, prescribe virtually chlorine-free phosgene having residual chlorine contents of not more than 1000 ppm or even not more than 100 ppm or even not more than 10 ppm, particularly since chlorine residues have an adverse effect on the color number of the isocyanates.

In addition, the activity of the activated carbon catalyst is reduced irreversibly when the phosgene reactor is operated with a stoichiometric excess of chlorine for a prolonged period exceeding a few hours.

It is therefore necessary for an excess of carbon monoxide to be ensured in the feed stream to the phosgene reactor. In general, the reactor is operated with a stoichiometric excess of carbon monoxide in the range from 1 to 10%, preferably from 2.5 to 4%, depending on the phosgene load of the reactor at all times. However, even at unchanged flows of the two feed streams carbon monoxide and chlorine, undesirable operating states in which an excess of carbon monoxide is no longer ensured can occur at times because the quality of the carbon monoxide feed stream, in particular the proportion of inerts, in particular nitrogen, frequently fluctuates in the range from 0.5 to 4% by volume, based on the total volume of the carbon monoxide stream.

The obvious solution, namely to operate at such a high stoichiometric excess of carbon monoxide that such fluctuations in the composition of the carbon monoxide feed stream do not significantly affect the excess of carbon monoxide in the feed stream to the reactor, is, however, ruled out for economic reasons.

It was therefore an object of the invention to provide a process for preparing phosgene in a shell-and-tube reactor, by means of which it is ensured that chlorine-free phosgene product conforming to required specifications is obtained and it is at the same time ensured, in a simple manner, that the carbon monoxide consumption is minimal.

This object is achieved by a process for preparing phosgene by reaction of a feed stream obtained by combining and mixing a chlorine feed stream and a carbon monoxide feed stream, with the carbon monoxide being introduced in a stoichiometric excess over chlorine, in catalyst tubes filled with beds of activated carbon in a reactor having a bundle of catalyst tubes, to give a product gas mixture which is separated into a liquid, phosgene-comprising product stream and an offgas stream comprising carbon monoxide which is discharged via a pressure-regulating valve, where the reaction of the feed stream in the reactor and the separation of the product gas mixture are carried out under a pressure in the range from 2.0 to 6.0 bar gauge, wherein the excess of carbon monoxide in the feed stream to the reactor is regulated by continuously measuring the flow and the concentration of carbon monoxide in the offgas stream, calculating the actual value of the excess of carbon monoxide in the feed stream to the reactor from these measurements in combination with the continuously measured values for the flow of the carbon monoxide feed stream and the flow of and the chlorine concentration in the chlorine feed stream and matching this to the intended value of the excess of carbon monoxide in the feed stream to the reactor by adapting the flow of the carbon monoxide feed stream and/or the flow of the chlorine feed stream.

It has been found that it is possible to regulate and set the excess of carbon monoxide in the feed stream in such a way that it is always ensured that a chlorine-free phosgene product is obtained and that the carbon monoxide consumption is minimal at the same time.

For this purpose, the flow and the chlorine concentration of the chlorine feed stream and also the flow of the carbon monoxide feed stream are measured continuously.

The direct measurement of the quality, i.e. the carbon monoxide concentration of the carbon monoxide feed stream, would, however, be difficult to realize because of the high operating pressure, be imprecise because of the high flow rate with very low proportions of inerts and problematical from a safety point of view because of the gases which are hazardous to health, in particular carbon monoxide.

On the other hand, it has been found that it is possible to calculate the actual value of the excess of carbon monoxide in the feed stream from other data which can readily be obtained by measurement, namely from the amount and composition of the offgas stream leaving the plant in combination with the amount and composition of the chlorine feed stream (the composition of the chlorine feed stream has been found on the basis of experience to alter little) and the amount of the carbon monoxide feed stream, in each case for the respective operating state.

The intended value for the excess of carbon monoxide in the feed stream to the reactor is calculated for the particular state, i.e. taking into account the geometry of the activated carbon beds, the phosgene load and the operating pressure, on the basis of a reaction kinetic model which is validated by experimental measurements.

In the present case, the parameter to be regulated, viz. the excess of carbon monoxide in the feed stream to the reactor, is thus continuously calculated, compared with the intended value which has been calculated for the respective operating state or determined experimentally and influenced via the control variable, viz. the flow of the carbon monoxide feed stream, so as to match it to the intended value.

In a preferred embodiment, the intended values of the excess of carbon monoxide in the feed stream which have been calculated on the basis of a reaction kinetic model are tested for plausibility by experimentally determining the excess of carbon monoxide at which chlorine breakthrough takes place in a pilot reactor having a single catalyst tube which has the same dimensions as the catalyst tubes of the reactor under the same operating conditions as in the reactor, with the catalyst tube being filled to various fill heights with activated carbon catalyst and a phosgene load spectrum being passed through for each fill height, by means of a connected chlorine measurement.

The actual values and the intended values of the excess of carbon monoxide in the feed stream to the reactor are advantageously indicated in the process control system for the process. In this way, the actual values can be matched to the intended values either automatically or manually.

In a preferred embodiment, the specific carbon monoxide consumption is reduced further by separating the phosgene product from the product gas mixture from the reactor and separating off a substream from the remaining gas stream and recirculating this substream as recycle stream to a point upstream of the phosgene reactor. The recycle stream frequently has a remaining carbon monoxide concentration in the range from 20 to 60% by weight, preferably from 30 to 50% by weight, based on the total weight of the recycle stream.

The substream which is recirculated as recycle stream to a point upstream of the phosgene reactor can amount to preferably from 40 to 95% by weight, preferably from 75 to 90% by weight, of the gas stream which remains from the product gas mixture after the liquid phosgene has been separated off.

The recirculation of the recycle stream to a point upstream of the phosgene reactor is advantageously effected via a driving jet nozzle which is driven by the admission pressure of one of the two feed streams, viz. the carbon monoxide feed stream or the chlorine feed stream. The driving jet nozzle and more preferably also the line for the recirculation is/are preferably made of a steel which is resistant to corrosion by chlorine and phosgene.

Liquid phosgene is separated off from the product gas mixture downstream of the phosgene reactor by condensation, preferably in two stages. The remaining gas stream is preferably divided into a substream which is recirculated as recycle stream to a point upstream of the phosgene reactor and a residual stream from which phosgene is scrubbed out in a scrubbing column to leave an offgas stream which is discharged from the plant. The phosgene stream from the scrubbing column can be combined with the product stream from the preferably two-stage condensation.

In the process variant with recirculation of a substream to a point upstream of the phosgene reactor, the flow of the recycle stream is measured continuously and the carbon monoxide concentration of the recycle stream is calculated continuously from the measured data for the flow and the carbon monoxide concentration of the offgas stream in combination with the operating conditions temperature and pressure of the condensation. These data, i.e. the flow and the carbon monoxide concentration of the recycle stream, are continuously employed in the calculation of the actual value of the excess of carbon monoxide in the feed stream to the reactor.

In one embodiment, the flow of the offgas stream is measured upstream of the pressure-regulating valve for discharge of the offgas stream from the plant and the carbon monoxide concentration of the offgas stream is measured downstream of the pressure-regulating valve, for example by IR spectrometry.

Compared to measurement of the carbon monoxide concentration in the feed stream to the phosgene reactor, measurement of the carbon monoxide concentration in the offgas stream is significantly simpler and more precise; in particular, the flow is significantly lower and a measurement under elevated pressure is not necessary, in particular no pressure-resistant measurement cells are required.

In a further embodiment, the flow of the offgas stream and the concentration of carbon monoxide in the offgas stream are measured continuously downstream of the pressure-regulating valve.

The reactor for the reaction of carbon monoxide and chlorine to form phosgene can preferably comprise a main reactor and an after-reactor. In particular, the reaction in the after-reactor can be carried out to a residual conversion of 10% and the after-reactor can be operated adiabatically or with cooling.

Two parallel measurement facilities which are operated with a time offset can advantageously be provided downstream of the pressure-regulating valve for the determination of the carbon monoxide concentration in the offgas, and therefore no downtimes occur.

In addition, the chlorine content of the product gas mixture downstream of the phosgene reactor can preferably be measured at intervals or continuously.

The excess of carbon monoxide in the feed stream can also be adjusted roughly on the basis of this chlorine content measurement for the product gas mixture downstream of the phosgene reactor; however, this way of measuring the chlorine and regulating the reactor is not very reliable.

The invention is illustrated below with the aid of a drawing.

Figure 2:
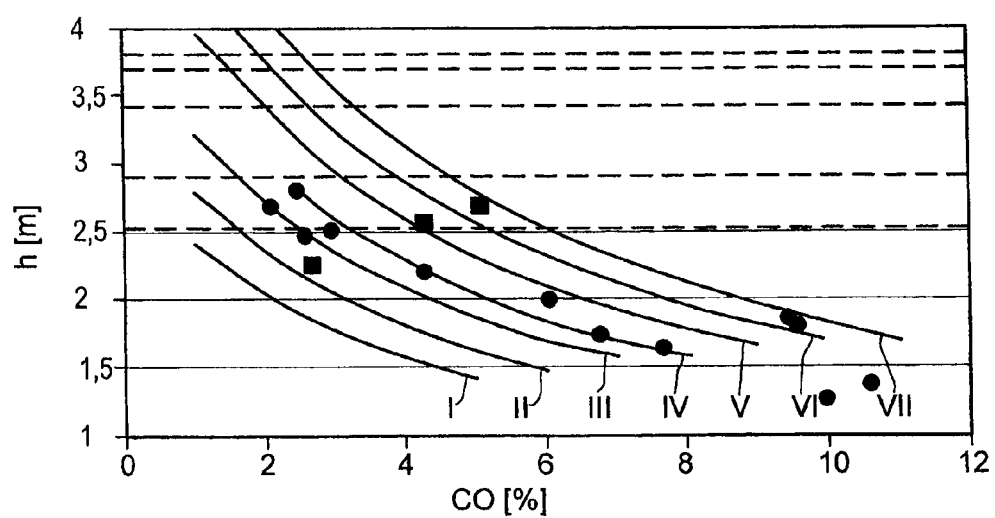

In the drawing:

FIG. 1 shows a preferred embodiment of a schematic plant for carrying out the process of the invention, and FIG. 2 shows an operator diagram with a group of parameters for the intended value of the carbon monoxide excess as a function of the fill height of the catalyst tubes and the phosgene load.

The schematic depiction in FIG. 1 shows a phosgene reactor R into which a chlorine feed stream, reference numeral 2, and a carbon monoxide feed stream, reference numeral 3, are fed as feed stream 1 after combining and mixing in a static mixer M.

The product gas mixture 4 from the reactor R is, in the preferred embodiment shown in the figure, fed to two condensers K connected in series. Here, liquid phosgene is separated off as product stream 5 to leave a gas stream 7 which is divided into a recycle stream 8 and a remaining stream 9. The recycle stream 8 is recycled to a point upstream of the reactor R via a driving jet nozzle T which is, for example, driven by means of the admission pressure of the carbon monoxide feed stream 3 in the embodiment shown in the figure. The remaining stream 9 is fed to a scrubbing column W in which further phosgene product is scrubbed out by means of a suitable solvent, for example monochlorobenzene, to leave an offgas stream 6 which is discharged from the plant.

FIG. 2 shows an operator diagram with a group of parameters showing the intended values for the excess of carbon monoxide in the feed stream as a function of the operating conditions catalyst fill height in the catalyst tubes, phosgene load, pressure and temperature.

The excess of carbon monoxide, CO, in the feed stream to the phosgene reactor is shown on the abscissa in percent and the fill height of the catalyst tubes, h in meters, is shown on the ordinate.

The curves I to VII denote different load states, in each case in kg of phosgene/$m^2$/s: curve I corresponds to a phosgene load of 1.4, curve II corresponds to a phosgene load of 1.6, curve III corresponds to a phosgene load of 1.8, curve IV corresponds to a phosgene load of 2.0, curve V corresponds to a phosgene load of 2.2, curve VI corresponds to a phosgene load of 2.4 and curve VII corresponds to a phosgene load of 2.6.

The operator diagram shown in FIG. 2 was constructed experimentally by means of experiments in the following manner:

A catalyst tube of duplex steel 1.4462 having an external diameter of 44.5 mm, a wall thickness of 2.6 mm and a length of 5 m as is customary in the synthesis of phosgene is used as starting point. This is filled with activated carbon catalyst to various fill heights, beginning with a fill height of 1.5 m and increasing in 0.25 m steps to a maximum fill height of 4.5 m.

For each fill height, the phosgene load is increased in 0.2 kg of phosgene/$m^2$/s steps from 1.4 to 2.6 kg of phosgene/$m^2$/s and the carbon monoxide excess at which chlorine breakthrough takes place is determined by means of a connected chlorine measurement.

The process of the invention enables the intended value for the excess of carbon monoxide for the respective operating state of the reactor to be taken significantly closer to the limit. This makes it possible, with a simultaneously minimal carbon monoxide consumption, to avoid downtimes of the plant associated with considerable work for effecting a change of catalyst: the catalyst change, i.e. emptying of the catalyst tubes, cleaning, testing, refilling, making the catalyst phosgene-free and drying, generally takes from 12 to 17 working days. The process of the invention enables the running times of the catalyst tubes to be increased so that they coincide with the legally prescribed maintenance intervals, generally from 2 to 5 years.

These experimentally determined intended values were used for adjusting the reaction kinetic model.

The invention claimed is:

1. A process for preparing phosgene, the process comprising:

reacting a reactant feed stream obtained by combining and mixing a chlorine feed stream and a carbon monoxide feed stream, wherein the carbon monoxide is introduced in a stoichiometric excess over chlorine, in catalyst tubes filled with beds of activated carbon in a reactor comprising a bundle of catalyst tubes, to give a product gas mixture which is separated into a liquid, phosgene-comprising product stream and an offgas stream comprising carbon monoxide which is discharged via a pressure-regulating valve, wherein the reaction of the reactant feed stream in the reactor and the separation of the product gas mixture are carried out under a pressure in the range from 2.0 to 6.0 bar gauge, and wherein the excess of carbon monoxide in the reactant feed stream is regulated without directly measuring the concentration of the carbon monoxide in the carbon monoxide feed stream by continuously measuring (i) the flow and the concentration of carbon monoxide in the offgas stream, (ii) the flow and concentration of the chlorine in the chlorine feed stream, and (iii) the flow of the carbon monoxide feed stream, calculating the actual value of the excess of carbon monoxide in the reactant feed stream from measurements (i), (ii), and (iii), and matching the actual value of the excess of carbon monoxide in the reactant feed stream to an intended value of the excess of carbon monoxide in the reactant feed stream by adjusting at least one selected from the group consisting of the flow of the carbon monoxide feed stream and the flow of the chlorine feed stream.

2. The process of claim 1, wherein the intended value of the excess of carbon monoxide in the reactant feed stream is calculated for a prevailing operating state of the reactor R on the basis of a reaction kinetic model.

3. The process of claim 2, wherein the intended value of the excess of carbon monoxide in the reactant feed stream, which has been calculated on the basis of the reaction kinetic model, is tested for plausibility by experimentally determining the excess of carbon monoxide at which chlorine breakthrough takes place in a pilot reactor having a single catalyst tube with the same dimensions as the catalyst tubes of the reactor under the same operating conditions as in the reactor, wherein the catalyst tube is filled to various fill heights with an activated carbon catalyst and a phosgene load spectrum is passed through for each fill height, by means of a connected chlorine measurement.

4. The process of claim 1, wherein the actual value and the intended value for the excess of carbon monoxide in the reactant feed stream are indicated in a process control system for the process.

5. The process of claim 1, wherein the liquid, phosgene-comprising product stream is separated off from the product gas mixture by condensation, leaving a gas stream which is divided into a substream which is recirculated as a recycle stream to a point upstream of the reactor and a residual stream from which phosgene is scrubbed out in a scrubbing column, wherein the offgas stream from the scrubbing column is discharged and the flow of the recycle stream is measured continuously and the carbon monoxide concentration of the recycle stream is calculated continuously from measured data for the flow and the carbon monoxide concentration of the offgas stream in combination with the operating temperature and pressure of the condensation and the flow and the carbon monoxide concentration of the recycle stream are continuously employed in the calculation of the actual value of the excess of carbon monoxide in the reactant feed stream.

6. The process of claim 1, wherein the flow of the offgas stream is measured upstream of the pressure-regulating valve and the concentration of carbon monoxide in the offgas stream is measured downstream of the pressure-regulating valve.

7. The process of claim 1, wherein the flow of the offgas stream and the concentration of carbon monoxide in the offgas stream are measured continuously downstream of the pressure-regulating valve.

8. The process of claim 1, wherein the separation of the liquid, phosgene stream from the product gas mixture is carried out in two stages.

9. The process of claim 5, wherein the recycle stream has a carbon monoxide concentration in the range from 20 to 60% by weight based on the total weight of the recycle stream.

10. The process of claim 5, wherein the recycle stream is recirculated to a point upstream of the reactor through a driving jet nozzle which is driven by the carbon monoxide feed stream or the chlorine feed stream.

11. The process of claim 1, wherein the reactor comprises a main reactor and an after-reactor.

12. The process of claim 11, wherein the reaction in the after-reactor is carried out to a residual conversion of 10% and the after-reactor is operated adiabatically or with cooling.

13. The process of claim 1, wherein two parallel measurement facilities which are operated with a time offset are provided downstream of the pressure-regulating valve for the measuring of the carbon monoxide concentration in the off-gas stream.

14. The process of claim 1, wherein the chlorine content of the product gas mixture is measured downstream of the reactor.

15. The process of claim 5, wherein the recycle stream has a carbon monoxide concentration in the range from 30 to 40% by weight based on the total weight of the recycle stream.

16. The process of claim 10, wherein the driving jet nozzle is driven by the carbon monoxide feed stream.

17. The process of claim 5, wherein the separation of the liquid, phosgene stream from the product gas mixture by condensation is carried out in two stages.

18. The process of claim 10, wherein the driving jet nozzle is driven by the chlorine feed stream.

19. The process of claim 2, wherein the calculation of the intended value for the excess of carbon monoxide in the reactant feed stream takes into account the geometry of the activated carbon beds, the phosgene load and the operating pressure.

* * * * *